(12) United States Patent
Matsumoto et al.

(10) Patent No.: US 6,353,962 B1
(45) Date of Patent: Mar. 12, 2002

(54) WIPER AND WIPER BLADE FOR VEHICLES

(75) Inventors: Hiroshi Matsumoto; Toshiaki Ooshima, both of Shizuoka-ken; Junichi Shikada; Hitoshi Inada, both of Saitama-ken, all of (JP)

(73) Assignees: Asmo Co., Ltd., Shizuoka-ken (JP); Nippon Wiper Blade Co., Ltd., Saitama-ken (JP)

( * ) Notice: Subject to any disclaimer, the term of this patent is extended or adjusted under 35 U.S.C. 154(b) by 0 days.

(21) Appl. No.: 09/364,783

(22) Filed: Jul. 30, 1999

(51) Int. Cl.$^7$ .................................................. B60S 1/40
(52) U.S. Cl. .................................................. 15/250.32
(58) Field of Search ........................ 15/250.32, 250.44, 15/250.43, 250.361

(56) References Cited

U.S. PATENT DOCUMENTS

| | | | | |
|---|---|---|---|---|
| 4,348,782 A | * | 9/1982 | Fournier | 15/250.32 |
| 4,450,602 A | * | 5/1984 | Miaocco | 15/250.32 |
| 4,598,438 A | * | 7/1986 | Egner-Walter et al. | 15/250.32 |
| 4,670,934 A | * | 6/1987 | Epple et al. | 15/250.32 |
| 5,145,274 A | * | 9/1992 | Schon | 15/250.32 |
| 5,937,474 A | * | 8/1999 | Hussaini | 15/250.32 |

FOREIGN PATENT DOCUMENTS

| | | | | |
|---|---|---|---|---|
| DE | 2715148 | * | 10/1978 | 15/250.32 |
| DE | 2919960 | * | 11/1979 | 15/250.32 |
| DE | 3914629 | * | 11/1989 | 15/250.32 |
| DE | 4128839 | * | 4/1992 | 15/250.32 |
| EP | 356079 | * | 2/1990 | 15/250.32 |
| FR | 2631300 | * | 11/1989 | 15/250.32 |
| GB | 2019203 | * | 10/1979 | 15/250.32 |
| JP | 60-78655 | | 11/1983 | |
| JP | 60-75158 | | 5/1985 | |
| JP | 63-80264 | | 11/1986 | |
| JP | 63-89869 | | 12/1986 | |
| JP | 63-145752 | | 3/1987 | |
| JP | 4-31651 | | 7/1990 | |
| JP | 3-23404 | | 5/1991 | |
| WO | WO 99/20502 | | 4/1999 | |

OTHER PUBLICATIONS

English Abstract of Japanese Patent No.: 60–75158 "Rotation restriction structure of wiper having U–shaped hook".
English Abstract of Japanese Patent No.: 60–78655 "Vehicle Wiper".
English Abstract of Japanese Patent No.: 63–80264 "Vehicle Wiper".
English Abstract of Japanese Patent No.: 63–89869 "Vehicle Wiper".
English Abstract of Japanese Patent No.: 63–145752 "Connector for vehicle wiper".
English Abstract of Japanese Patent No.: 4–31651 "Primary lever for wiper".

* cited by examiner

Primary Examiner—Gary K. Graham
(74) Attorney, Agent, or Firm—Townsend and Townsend and Crew LLP

(57) ABSTRACT

An automobile wiper that restricts relative pivoting between the arm and the wiper blade without increasing costs. The automobile wiper includes a wiper blade having an upper wall on which an opening is provided. A clip is supported by a pin in the opening pivotally relative to the wiper blade. The clip has a flange extending perpendicular to the pin. The distal end of the arm is fixed to the clip. Relative pivoting between the clip and the wiper blade is restricted by contact between the flange and the lower surface of the upper wall of the wiper blade.

16 Claims, 5 Drawing Sheets

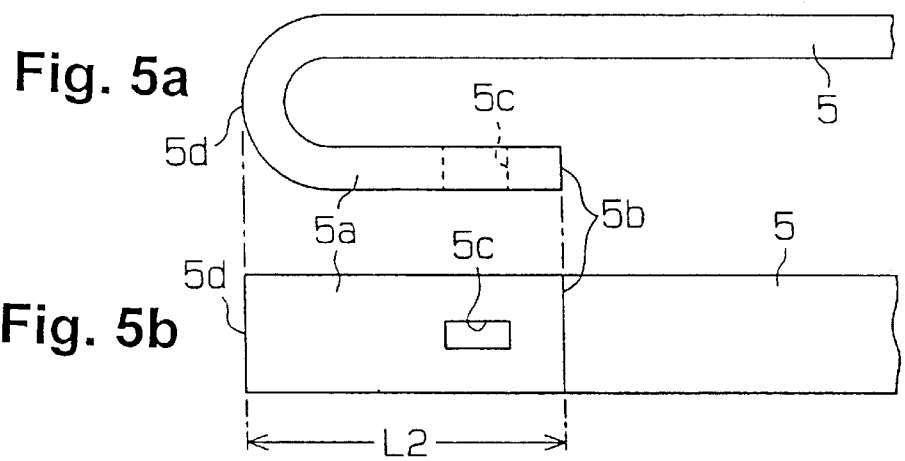
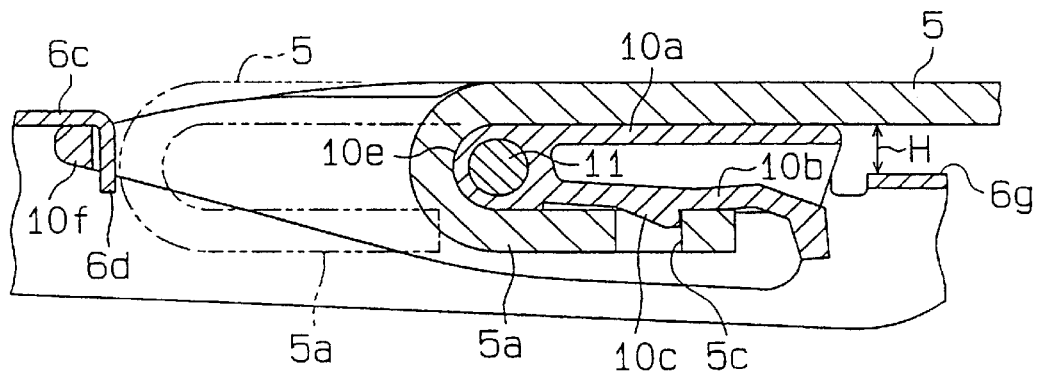
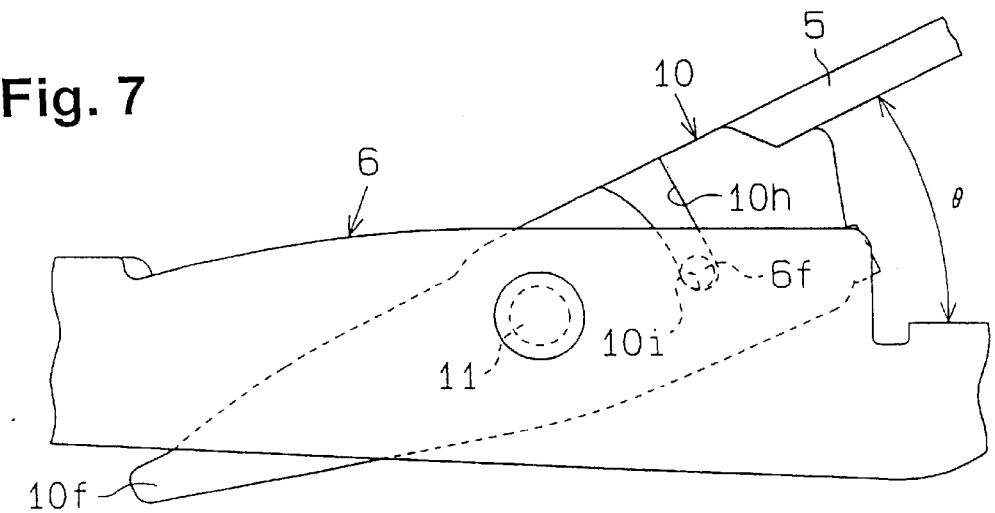

WIPER AND WIPER BLADE FOR VEHICLES

BACKGROUND OF THE INVENTION

The present invention relates to automobile wipers, and more particularly, to wiper blades connected pivotally to wiper arms and automobile wipers provided with wiper blades.

A prior art automobile wiper includes an arm and a wiper blade attached to the arm. A rubber piece is attached to the wiper blade to wipe the windshield. The wiper blade includes a primary frame having an upper surface on which an opening extends at the longitudinally middle section. A pin extends between the two side walls of the primary frame near the opening. A clip is pivotally coupled to the distal end of the pin. The distal end of the arm is fixed to the clip to fasten the wiper blade to the arm. Accordingly, the wiper blade pivots about the pin relative to the arm.

The rubber piece is normally pressed against the windshield by the arm. Normally, the arm and the wiper blade are substantially parallel to each other such that they do not contact each other. When the arm is pivoted in this state, the rubber piece is pivoted along the surface of the curved windshield to wipe the windshield.

The wiper blade is separated from the windshield and held upright relative to the windshield (lock-back state) when, for example, washing the automobile. In this state, the wiper blade pivots about the pin and may come into contact with the arm. Contact between the wiper blade and the arm may damage the film of rust preventive applied to the arm or the wiper blade. Such damage would degrade the appearance of the wiper and decrease the durability of the wiper.

Japanese Examined Utility Model Publication No. 3-23404 describes an automobile wiper having a projection formed on the inner surface of a primary frame. A clip (connector) is pivotally supported by the primary frame. The clip has an arcuate guide groove to guide the projection of the primary frame. The projection is arranged in the guide groove. When the wiper blade is pivoted relative to the arm, the projection of the primary frame moves along the guide groove. The relative pivoting between the clip and the primary frame is restricted when the projection contacts the terminal end of the guide groove. In other words, further pivoting of the wiper blade relative to the arm is restricted at the terminal end of the guide groove.

However, the other end of the guide groove is opened to permit attachment of the clip to the primary frame. Accordingly, the relative pivoting of the wiper blade is restricted only at the position where the projection contacts the terminal end of the guide groove. In this structure, pivoting of the wiper blade is not restricted when the projection moves away from the opened end, or when the wiper blade pivots in the reverse direction. Thus, the wiper blade contacts the arm when in the lock-back state.

An automobile wiper that prevents damage to the film applied to the arm and the wiper blade by attaching resin parts to the locations of contact between the arm and the wiper blade has been proposed. However, due to the attachment of the additional parts, the costs related to the parts and to the assembling processes is increased. Furthermore, the shape of the arm and the wiper blade is restricted.

In recent years, long wiper blades have come to be employed to enlarge the wiped surface. Long wiper blades have a large moment of inertia. Thus, when the wiper blade hits the arm, the film is further apt to be damaged at the locations of contact. Furthermore, a great force acts on the portion supporting the wiper blade when using a long wiper blade. Thus, the wiper blade is apt to come loose. If the wiper blade is held loosely by the arm, some parts of the windshield will not be wiped.

SUMMARY OF THE INVENTION

Accordingly, it is a first objective of the present invention to provide an automobile wiper and wiper blade that can restrict the relative pivoting between the arm and the wiper blade without increasing costs.

It is a second objective of the present invention to provide an automobile wiper and wiper blade that suppresses loosening between the arm and the wiper blade.

To achieve the above objectives, in a first aspect of the present invention, a wiper for wiping an automobile windshield is provided. The wiper includes an arm, a wiper blade having an upper wall and a pair of side walls, and a connecting member. The upper wall has an opening. A pivot extends between the pair of side walls at the opening. The connecting member is supported pivotally relative to the wiper blade by the pivot in the opening. The connecting member is connected to the arm. The connecting member includes an extended portion extending perpendicular to the pivot. The extended portion contacts a predetermined portion of the wiper blade during relative pivoting between the connecting member and the wiper blade.

In a second aspect of the present invention, a wiper blade used in a windshield wiper, which has an arm, is provided. The wiper blade includes a pair of side walls, an upper wall having an opening, a pivot extending between the pair of side walls at the opening, and a connecting member supported pivotally relative to the wiper blade by the pivot in the opening. The connecting member is connected to the arm. The connecting member includes an extended portion extending perpendicular to the pivot. The extended portion contacts a predetermined portion of the wiper arm during relative pivoting between the connecting member and the wiper blade.

In a third aspect of the present invention, a wiper for wiping an automobile windshield is provided. The wiper includes an arm, a wiper blade including an upper wall and a pair of side walls, a pivot, and a connecting member. The arm has a coupling portion formed at a distal end of the arm. The upper wall has an opening. The pivot extends between the pair of side walls at the opening. The connecting member is supported pivotally relative to the wiper blade by the pivot in the opening. The connecting member has an extended portion and a connecting portion extending perpendicular to the pivot in opposite directions. The connecting portion engages the coupling portion. The extended portion contacts a predetermined portion of the wiper blade during relative pivoting between the connecting member and the wiper blade.

BRIEF DESCRIPTION OF THE DRAWINGS

FIG. 1b is a side view of FIG. 1a;

FIG. 1c is a cross-sectional view taken along line 1c—1c of FIG. 1a;

FIG. 2 is a side view showing the automobile wiper of FIG. 1a;

FIG. 3b is a side view of FIG. 3a;

FIG. 3c is a cross-sectional view taken along line 3c—3c of FIG. 3a;

FIG. 4b is a side view of FIG. 4a;

FIG. 4c is a cross-sectional view taken along line 4c—4c of FIG. 4a;

FIG. 4d is a bottom view of FIG. 4a;

FIG. 5a is a side view showing a coupling portion of an arm piece;

FIG. 5b is a bottom view of FIG. 5a;

FIG. 6 is an enlarged cross-sectional view showing the wiper blade arranged at a minimum inclination position relative to the arm; and FIG. 7 is an enlarged side view showing the wiper blade arranged at a maximum inclination position relative to the arm.

DETAILED DESCRIPTION OF THE PREFERRED EMBODIMENTS

A first embodiment according to the present invention will now be described with reference to FIGS. 1 to 7.

Figure 2:
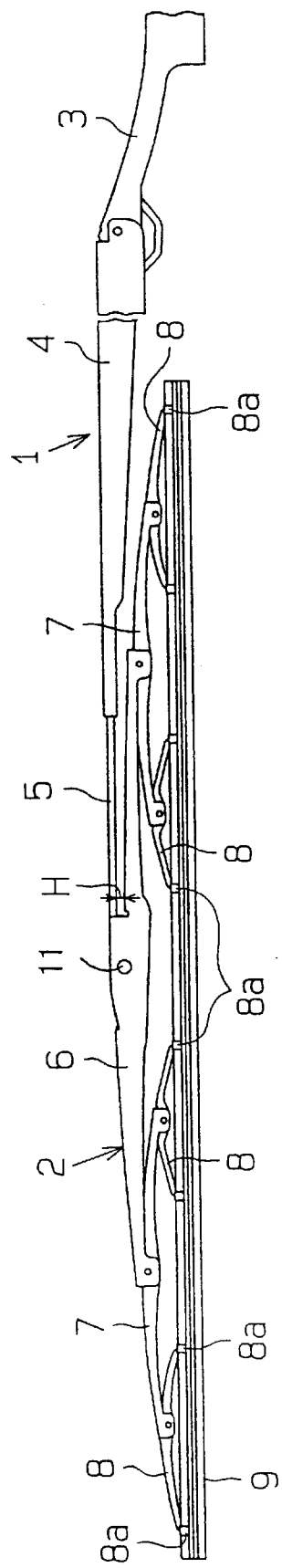

The automobile wiper shown in FIG. 2 includes an arm 1 and a wiper blade 2. The wiper blade 2 is pivotally connected to the arm 1. The arm 1 has an arm head 3 fixed to a pivot shaft (not shown) of the automobile, a retainer 4 connected to the distal end of the arm head 3, and an arm piece 5 fixed to the distal end of the retainer 4. As shown in FIGS. 5a and 5b, a hook-like coupling portion 5a is formed on the distal end of the arm piece 5. A rectangular slot 5c is formed near the distal end of the coupling portion 5a.

The wiper blade 2 includes a primary frame 6 connected to the arm 1, a pair of second frames 7 connected to the ends of the primary frame 6, two pairs of third frames 8, each pair of which is connected to the ends of each second frame 7, and a single rubber piece 9 held by the two pairs of third frames 8. In other words, the wiper blade 2 has a fractional frame structure. The third frames 8 each have a retaining piece 8a arranged at each of their ends. Thus, the rubber piece 8a is supported by eight retaining pieces.

Figure 3A:
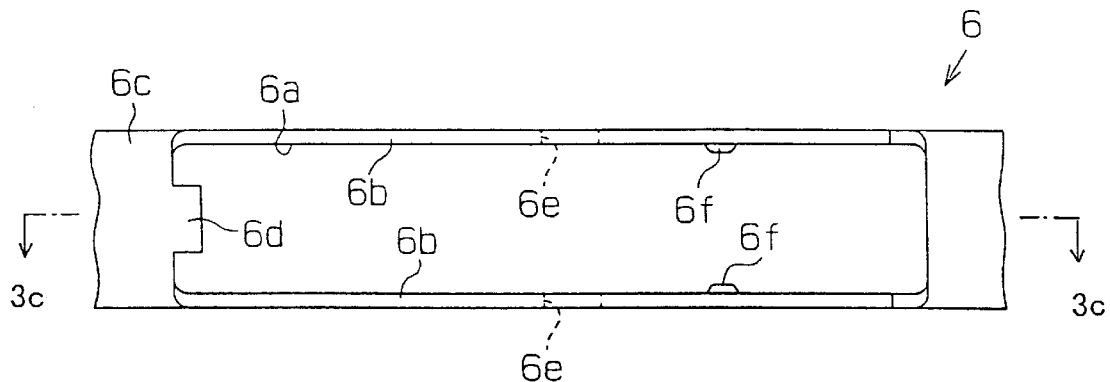
FIG. 3a is an enlarged plan view showing the primary frame.
Figure 3B:
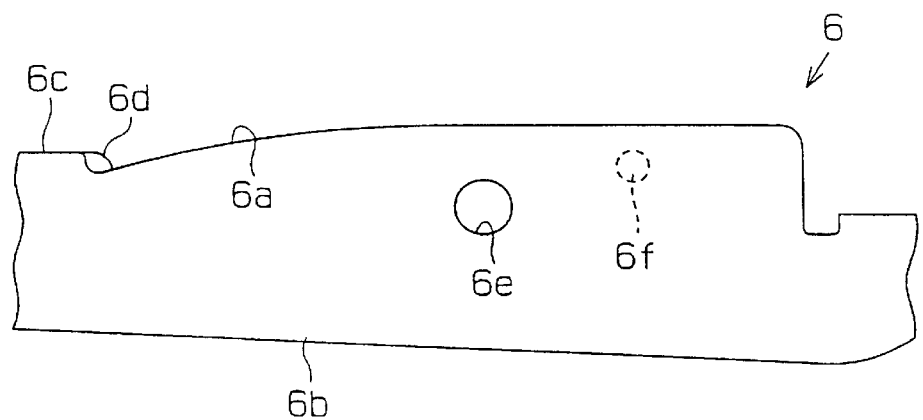
Figure 3C:
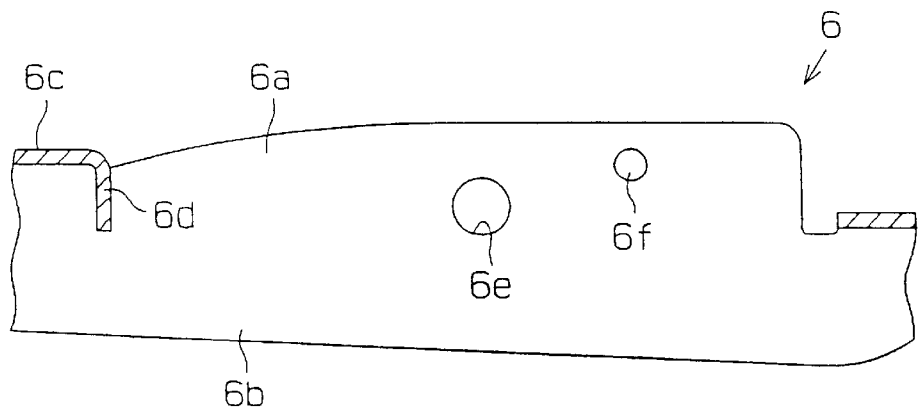

As shown in FIGS. 3a to 3c, the primary frame 6 includes a pair of parallel side walls 6b, and an upper wall 6c connecting the side walls 6b. A rectangular opening 6a extends through the upper wall 6c at the longitudinally middle section of the primary frame 6.

As shown in FIG. 3c, a bent piece 6d is bent downward from the upper wall 6c at one longitudinal end of the opening 6a. A pin hole 6e is formed in each side wall 6b near the opening 6a. As shown in FIGS. 3a and 3b, a pair of opposed projections 6f are formed on the inner side of the side walls 6b. Each projection 6f is located on the right side of the pin hole 6e as viewed in FIGS. 3a and 3b.

Figure 1A:
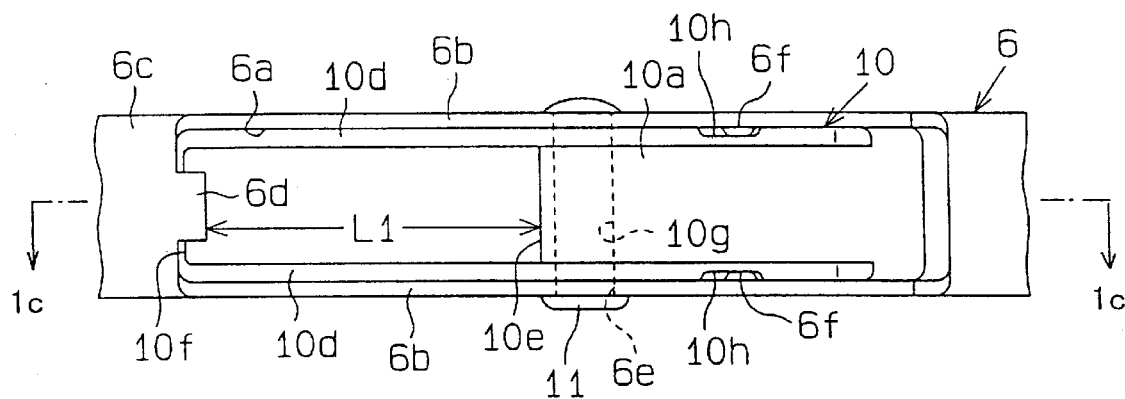
FIG. 1a is an enlarged plan view showing an automobile wiper according to a first embodiment of the present invention.
Figure 1B:
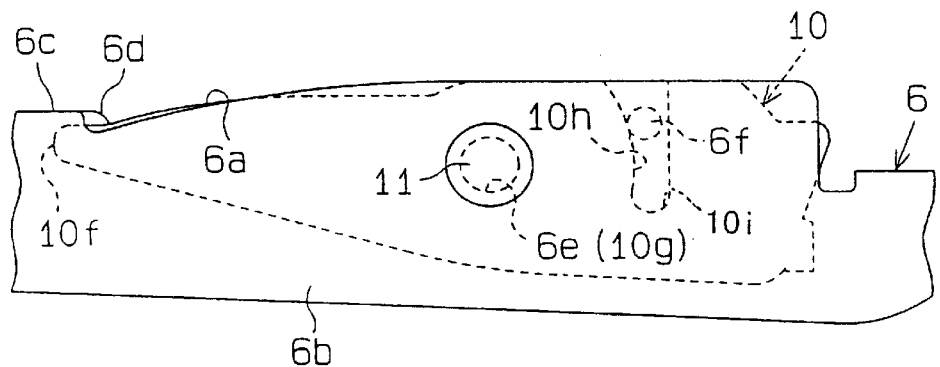
Figure 1C:
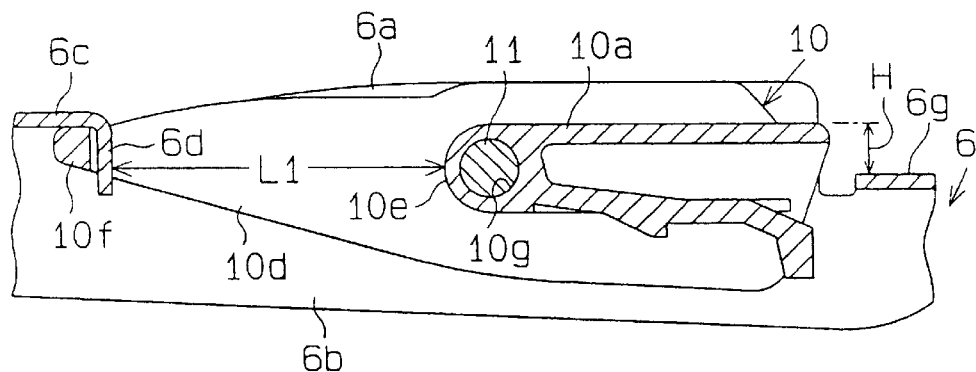
Figure 4A:
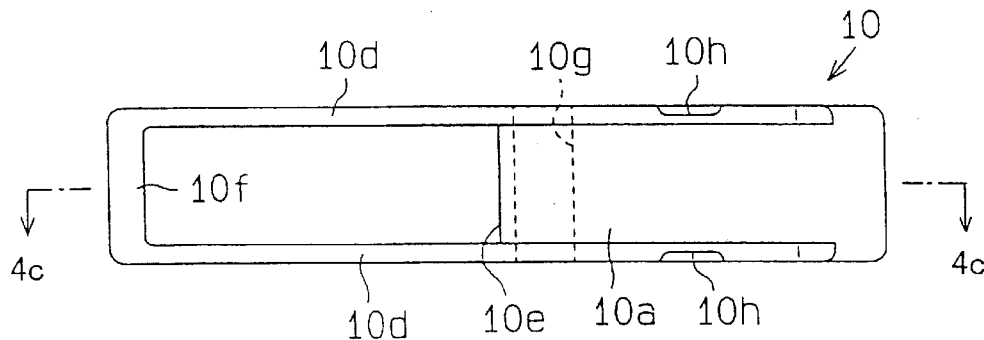
FIG. 4a is an enlarged plan view showing a clip.

As shown in FIGS. 1a to 1c, a clip 10, which serves as a connecting member, is arranged between the two side walls 6b of the primary frame 6. The clip 10 is preferably made of resin and is pivotal in a plane parallel to the side walls 6b. The primary frame 6 is connected to the arm 1 by the clip 10. As shown in FIGS. 4a, 4c, and 4d, the clip 10 has a connecting portion 10a, which corresponds to the coupling portion 5a of the arm piece 5. As shown in FIG. 4c, the cross-section of the connecting portion 10a is generally U-shaped to correspond with the coupling portion 5a. The coupling portion 5a of the arm piece 5 clamps the connecting portion 10a when assembled. An elastic piece 10b, which deforms elastically, is formed on the lower portion of the connecting portion 10a. A protrusion 10c, which engages the slot 5c of the arm piece 5, is formed in the middle of the elastic piece 10b.

As shown in FIGS. 4a to 4d, the clip 10 has a pair of side plates, or flanges 10d. The two flanges 10d extend parallel to each other from an end 10e of the connecting portion 10a. The distal ends of the two flanges 10d are connected to each other by a reinforced portion 10f. A cavity is formed between the two flanges 1d, the end 10e of the connecting portion 10a, and the reinforced portion 10f.

A pin hole 10g extends through the two flanges 10d and the connecting portion 10a midway along the side plates of the clip 10. More specifically, the pin hole 10g extends through the connecting portion 10a near the end 10e.

Figure 4B:
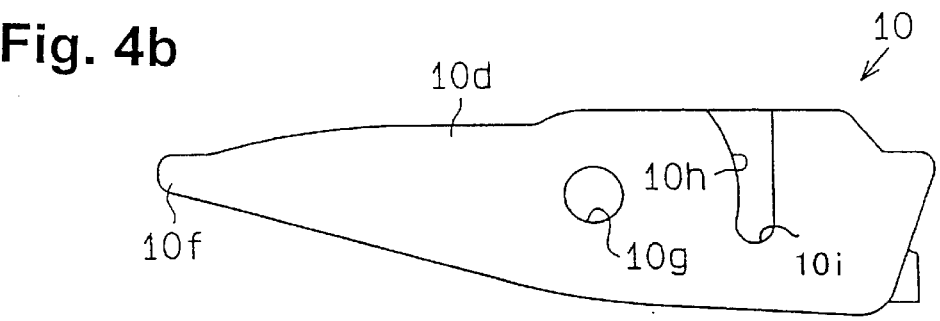
Figure 4C:
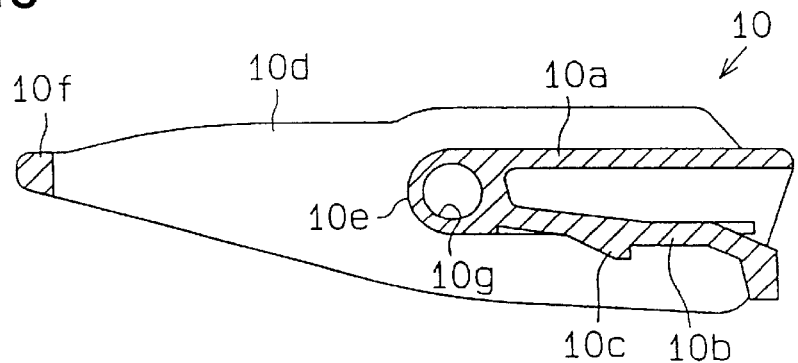
Figure 4D:
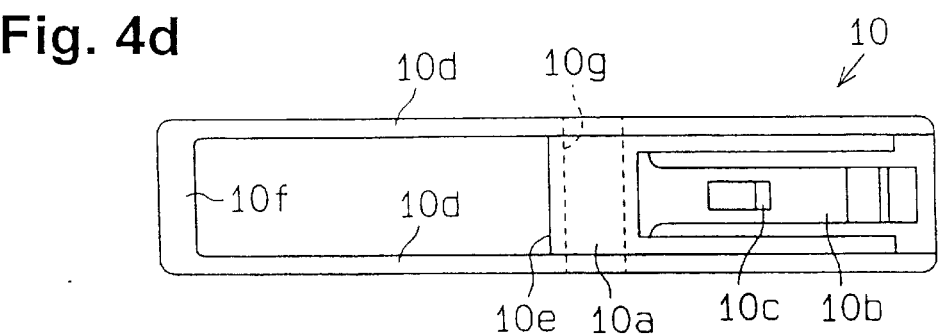

The clip 10 further has an arcuate guide groove 10h formed on each side surface to the right of the pin hole 10g, as viewed in FIGS. 4a, 4b. Each guide groove 10h has a terminal end 10i and an open end located at the top of the side surface of the clip 10.

To attach the clip 10 to the primary frame 6, the clip 10 is inserted into the space between the side walls 6b from below the primary frame 6, as shown in FIG. 1. The projections 6f of the primary frame 6 are arranged in the guide grooves 10h of the clip 10. The outer surfaces of the two flanges 10d are substantially parallel to and separated by a slight gap (not shown) from the side walls 6b of the primary frame 6. A pin 11 is then inserted through the pin holes 6e, 10g. This connects the clip 10 to the primary frame 6 pivotally about the pin 11, or pivot. When the clip 10 pivots relative to the primary frame 6, the projections 6f move along the arcuate guide grooves 10h.

The left end of the clip 10 (i.e., the reinforced portion 10f and the distal ends of the two flanges 10d) is located at the left side of the bent piece 6d of the primary frame 6, as viewed in FIG. 1c. In other words, the reinforced portion 10f is engaged with the bent piece 6d.

The distance L1, shown in FIG. 1a, between the end 10e of the connecting portion 10a and the bent piece 6d is longer than the distance L2, shown in FIGS. 5a and 5b, between an end 5d and a distal end 5b of the coupling portion 5a of the arm piece 5.

The procedure for attaching the arm piece 5 to the clip 10 will now be described. As shown by the broken lines in FIG. 6, the coupling portion 5a of the arm piece 5 is inserted into the space between the end 10e of the connecting portion 10a and the bent piece 6d. The arm piece 5 is then moved to the position shown by the solid lines in FIG. 6. This elastically deforms the elastic piece 10b and causes the connecting portion 10a to be clamped by the coupling portion 5a. Furthermore, the protrusion 10c engages the slot 5c of the coupling portion 5a. Accordingly, the arm piece 5 is fixed to the clip 10.

The position of the pin 11 and the position of contact between the reinforced portion 10f and the lower surface of the upper wall 6c is determined so that the upper surface of the connecting portion 10a of the clip 10 is separated from the upper wall surface 6g of the primary frame 6 by distance H when the reinforced portion 10f contacts the lower surface of the upper wall 6c. Thus, the wiper blade 2 moves between a first restricting position (minimum inclination position) shown in FIG. 6 and a second restricting position (maximum inclination position) shown in FIG. 7. As a result, the wiper blade 2 does not contact the arm 1.

The automobile wiper of the first embodiment has the advantages described below.

(1) In the automobile wiper of the first embodiment, the engagement of the distal portions of the two flanges 10d and the reinforcing portion 10f with the lower surface of the upper wall 6c of the primary frame 6 limits the relative pivoting range of the clip 10 with respect to the primary frame 6. Further, as shown in FIG. 7, the relative pivoting range of the clip 10 relative to the primary frame 6 is limited by the contact between the projections 6f of the primary frame 6 and the terminal ends 10i of the guide grooves 10h of the clip 10 so that the maximum angle between the arm piece 5 and the wiper blade 2 is θ degrees or less. That is, the automobile wiper restricts the relative pivoting between the primary frame 6 and the clip 10 (i.e., the relative pivoting between the arm 1 and the wiper blade 2) within a range such that the arm 1 and the wiper blade 2 do not contact each other. As a result, the wiper blade 2 does not contact the arm 1 even if, for example, the arm 1 and the wiper blade 2 are held upright relative to the windshield in a lock-back state. Accordingly, since the applied film is prevented from being damaged, the outer appearance of the wiper remains the same. Furthermore, the high durability of the wiper is maintained.

(2) The outer surface of the clip 10 is separated from the side walls 6b of the primary frame 6 by a slight distance. Since the distance is relatively small, the clip 10 is not loosely held between the side walls 6b of the primary frame 6. As a result, loosening of the wiper blade 2 relative to the arm 1 is restricted.

Furthermore, the wiper arm 1 is fixed to the clip 10 by engagement of the coupling portion 5a with the connecting portion 10a, which extends perpendicular to the pin 11. The flanges 10d extend in a direction opposite to that of the connecting portion 10a. In other words, the flanges 10d extend from one side of the pin 11 and the connecting portion 10a extends from the other side of the pin 11 so that the clip 10 extends longitudinally. This prevents loosening of the coupled portions of the wiper blade 2.

The clip 10 is separated by a slight gap from the side walls 6b of the primary frame 6. However, the clip 10 is provided with the pair of long flanges 10d. Accordingly, when the clip 10 receives an external force, the outer surfaces of the two flanges 10d come into substantial surface contact with the side walls 6b of the primary frame 6 (planar contact). This restricts inclination of the side surfaces of the clip 10 relative to the side walls 6b of the primary frame 6 and loosening of the clip 10. As a result, the wiper 1 wipes the windshield without leaving any unwiped areas.

(3) The two flanges 10d are connected at the reinforcing portion 10f. This prevents damage that may be caused when the distal end of the two flanges 10d contact the lower surface of the upper wall 6c of the primary frame 6. In addition, the reinforcing portion 10f prevents the outer surface of the thin flanges 10d from being deformed when the outer surfaces of the two flanges 10d contact the side walls 6b of the primary frame 6 to restrict loosening of the clip 10. In other words, the reinforcing portion 10f functions to prevent loosening of the clip 10.

(4) Furthermore, the reinforcing portion 10f prevents the distal portions of the two flanges 10d from being deformed downward when the distal portions of the two flanges 10d engage the bottom surface of the upper wall 6 of the primary frame 6. This limits pivoting of the clip 10 relative to the primary frame 6.

(5) The clip 10 is made of resin. Thus, even if the distal portions of the two flanges 10d and the reinforcing portion 10f contact the primary frame 6, the film applied to the portions of contact are not damaged.

(6) The distal portions of the flanges 10d and the reinforcing portion 10f contact the lower surface of the upper wall 6c of the primary frame 6. Thus, even if such contact damages the film applied to the points of contact, the outer appearance of the automobile wiper is not affected.

(7) The distance L1 between the end 10e of the connecting portion 10a and the bent piece 6d of the primary frame is slightly longer than the distance L2 between the end 5d and the distal end 5b of the coupling portion 5a of the arm piece 5. Accordingly, the coupling portion 5a of the arm piece 5 is inserted into the space between the end 10e of the connecting portion 10a and the bent piece 6d to engage the coupling portion 5a with the connecting portion 10a. In addition, when inserting the coupling portion 5a into the space, the end 5d of the coupling portion 5a is guided into the space by the bent piece 6d. This facilitates attachment of the coupling portion 5a.

The first embodiment may be modified as described below.

The flange 10d may be provided on only one side of the connecting portion 10a of the clip 10. In this case, the reinforcing portion 10f need not be formed. Instead, a contact portion extending from the distal end of the flange 10d and engaging the lower surface of the upper wall 6c of the primary frame 6 may be formed. In such structure, the distal portion of the flange 10d or the reinforcing portion 10f contacts the lower surface of the upper wall 6c of the primary frame 6. Thus, pivoting of the clip 10 relative to the primary frame 6 is limited.

The reinforcing portion 10f connecting the distal portions of the two flanges 10d may be eliminated. Such a structure also has the above advantages (1), (2), and (5) to (7).

The bent piece 6d need not be formed at the end portion of the upper wall 6c of the primary frame 6. Such a structure also has the above advantages (1) to (6).

The pivoting of the clip 10 relative to the primary frame 6 is limited by the contact between the projections 6f of the primary frame 6 and the terminal ends 10i of the arcuate guide grooves 10h of the clip 10. However, the pivoting may be limited through other means. For example, a projection extending from the lower portion of the primary frame 6 toward the upper wall 6c may be formed integrally with the primary frame 6. When the distal portion of the flanges 10d contacts the upper wall 6c and lower portion (projection), pivoting of the clip 10 relative to the primary frame 6 is limited.

The present examples and embodiments are to be considered as illustrative and not restrictive, and the invention is not to be limited to the details given herein, but may be modified within the scope and equivalence of the appended claims.

What is claimed is:

1. A wiper for wiping an automobile windshield, the wiper comprising:

a wiper arm;

a wiper blade including a pair of side walls and an upper wall connecting upper ends of the side walls, wherein the upper wall has an opening;

a pivot extending between the pair of side walls at the opening; and a connecting member supported pivotally relative to the wiper blade by the pivot in the opening within a predetermined pivot range that is defined between a first limit position and a second limit position, wherein the connecting member includes a connecting portion, to which the wiper arm is connected, and an extended portion extending perpendicular to the pivot from the connecting portion, the extended portion contacting a lower surface of the upper wall when the connecting member pivots in a first direction with respect to the wiper blade, the first limit position being, defined by the contact between the lower surface and the extended portion, wherein one of the connecting member and the wiper blade includes a guide groove having a closed first end and the other includes a profection arranged inside the guide groove, and wherein the projection contacts the first end of the guide groove when the connecting member pivots in a second direction which is opposite to the first direction, the second limit position being defined by the contact between the projection and the first end.

2. The wiper according to claim 1, wherein the wiper arm includes a hook-shaped coupling portion formed at a distal end of the wiper arm, and wherein the connecting member extends in a direction opposite to the extended portion.

3. The wiper according to claim 2, wherein the wiper blade includes a bent piece extending downward from the upper wall at one end of the opening, and wherein the coupling portion includes a folded back piece having a curved intermediate portion and a distal end, the distance between the bent piece and the connecting portion being greater than the distance between the curved intermediate portion and a distal end of the folded back piece.

4. The wiper according to claim 1, wherein the guide groove is arcuate and has an opened second end opposite to the closed first end.

5. The wiper according to claim 1, wherein the guide groove and the projection are formed opposite to a side where the extended portion is formed.

6. The wiper according to claim 1, wherein the extended portion includes a pair of flanges formed along the side walls of the wiper blade, each of the flanges having an outer surface facing the corresponding side wall, and wherein within the pivot range, most of the outer surface of the flanges is always in contact with the corresponding side wall adjacent to the opening.

7. The wiper according to claim 6, wherein substantially an entire surface of the flange contacts the side walls at the opening of the wiper blade when the connecting member is located at the first limit position.

8. The wiper according to claim 6, wherein the extended portion includes the pair of flanges, and wherein the connecting member includes a reinforcing portion for connecting distal ends of the pair of flanges.

9. The wiper according to claim 1, wherein the extended portion extends to a distal end of the wiper blade.

10. The wiper according to claim 1, wherein the connecting portion has a top surface, and wherein when the wiper blade is located at the first limit position, a gap is formed between the top surface of the connecting portion and the upper wall.

11. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade;

wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end; and wherein the extended portion includes a flange formed along the side walls of the wiper blade, and wherein substantially an entire surface of the flange contacts a corresponding side wall at the opening of the wiper blade when the connecting member is located at the first limited angle.

12. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade;

wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end; and wherein the extended portion includes a pair of flanges, and wherein the connecting member includes a reinforcing portion for connecting the distal ends of the pair of flanges.

13. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade;

wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end; and wherein the guide groove includes an arcuate guide groove having an open second end opposite to the closed first end.

14. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade;

wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end; and wherein the guide groove and the projection are located at the opposite side of the pivot from a side where the extended portion is formed.

15. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade; and wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end.

16. A wiper blade used in a windshield wiper having a wiper arm, wherein the wiper arm includes a hook-shaped coupling portion formed at a distal end of the arm to which the wiper blade is coupled, the wiper blade comprising:

a pair of side walls;

an upper wall having an opening, the upper wall connecting upper ends of the side walls;

a pivot extending between the pair of side walls at the opening;

a connecting member supported pivotally relative to the wiper blade by the pivot in the opening and pivotable over a predetermined, limited pivot range, wherein the connecting member includes a connecting portion, to which the coupling portion is connected, and an extended portion extending perpendicular to the pivot from the connecting portion, wherein the extended portion comes into substantial surface contact with the side walls adjacent to the opening when the connecting member pivots with respect to the wiper blade;

wherein the limited pivot range is defined between a first limit angle and a second limit angle, and wherein the extended portion contacts a lower surface of the upper wall when the connecting member pivots in a first direction with respect to the wiper blade, the first limit angle being defined by contact between the lower surface and the extended portion, wherein one of the connecting member and the wiper blade includes a guide groove having a closed first end and the other one includes a projection arranged inside the guide groove, and wherein the projection contacts the first end of the guide groove when the connecting member pivots in a second direction, which is opposite to the first direction, the second limit angle being defined by contact between the projection and the first end; and wherein the connecting portion has a top surface, and wherein when the wiper blade is located at the first limit position, a gap is formed between the top surface of the connecting portion and the upper wall.

* * * * *